US008443048B2

(12) United States Patent
Lingafelt et al.

(10) Patent No.: US 8,443,048 B2
(45) Date of Patent: *May 14, 2013

(54) METHOD, SYSTEM AND PROGRAM PRODUCT FOR ASSIGNING A RESPONDER TO A REQUESTER IN A COLLABORATIVE ENVIRONMENT

(75) Inventors: Charles Steven Lingafelt, Durham, NC (US); David Paul Merrill, New Paltz, NY (US); John Elbert Moore, Brownsburg, IN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/564,377

(22) Filed: Aug. 1, 2012

(65) Prior Publication Data

US 2012/0297323 A1 Nov. 22, 2012

Related U.S. Application Data

(63) Continuation of application No. 12/602,936, filed on Dec. 3, 2009, now Pat. No. 8,266,227, and a continuation of application No. 11/775,961, filed on Jul. 11, 2007, now abandoned.

(30) Foreign Application Priority Data

Jul. 11, 2008 (WO) .................. PCT/EP2008/059035

(51) Int. Cl.
  *G06F 15/16* (2006.01)
(52) U.S. Cl.
  USPC ............ 709/206; 709/227; 709/237; 370/352

(58) Field of Classification Search .................. 709/206, 709/217, 227, 237; 370/352
  See application file for complete search history.

(56) References Cited

U.S. PATENT DOCUMENTS 7,272,589 B1   9/2007 Guay et al.
7,475,119 B2 *  1/2009 Gusler et al. .................. 709/206

(Continued)

FOREIGN PATENT DOCUMENTS

EP   0009684 A   4/1980
WO   0209399 A2  1/2002

OTHER PUBLICATIONS

Non-Final Office Action dated Jul. 1, 2010 for U.S. Appl. No. 12/602,936.

(Continued)

*Primary Examiner* — Tesfay Yohannes
(74) *Attorney, Agent, or Firm* — Arthur J. Samodovitz (57) ABSTRACT

A method, system and program product for assigning a resource to a client in a collaborative environment. The method includes defining, using a tool, a threshold value for collaborative attributes for each resource responding to one or more clients and calculating on a periodic basis, using the tool, an updated value for the collaborative attributes for each resource. The method further includes comparing, upon receipt of a collaboration request, the updated value with the threshold value defined for collaborative attributes for a first resource and, if the updated value is less than the threshold value for the first resource, connecting the client to the first resource for establishing a collaborative session. If not, repeating comparing the updated value with the threshold value for the collaborative attributes defined for a next resource and connecting the client to the next resource whose updated value is less than the threshold value.

3 Claims, 5 Drawing Sheets

U.S. PATENT DOCUMENTS

| | | | |
|---|---|---|---|
| 7,519,730 B2 * | 4/2009 | Bailey et al. | 709/237 |
| 7,539,724 B1 * | 5/2009 | Callaghan | 709/205 |
| 7,684,556 B1 | 3/2010 | Jaiswal | |
| 7,844,293 B2 * | 11/2010 | Sung et al. | 455/518 |
| 7,870,535 B2 | 1/2011 | Rippert et al. | |
| 7,876,743 B2 * | 1/2011 | Garcia-Martin et al. | 370/352 |
| 7,882,178 B2 | 2/2011 | Lingafelt et al. | |
| 7,882,194 B2 | 2/2011 | Lingafelt et al. | |
| 2002/0019234 A1 | 2/2002 | Wright et al. | |
| 2002/0059164 A1 | 5/2002 | Shtivelman | |
| 2002/0091722 A1 | 7/2002 | Gupta et al. | |
| 2002/0138595 A1 | 9/2002 | Ruellan et al. | |
| 2003/0009603 A1 | 1/2003 | Ruths et al. | |
| 2003/0043180 A1 | 3/2003 | Gusler et al. | |
| 2003/0198187 A1 | 10/2003 | Mellquist et al. | |
| 2004/0158629 A1 | 8/2004 | Herbeck et al. | |
| 2005/0137015 A1 | 6/2005 | Rogers et al. | |
| 2005/0165925 A1 | 7/2005 | Dan et al. | |
| 2006/0017575 A1 | 1/2006 | McAdams | |
| 2006/0026253 A1 | 2/2006 | Kessen et al. | |
| 2006/0053195 A1 | 3/2006 | Schneider et al. | |
| 2006/0080432 A1 | 4/2006 | Spataro et al. | |
| 2006/0161651 A1 | 7/2006 | Ardulov et al. | |
| 2006/0248214 A1 | 11/2006 | Jackson et al. | |
| 2007/0011235 A1 * | 1/2007 | Mutikainen et al. | 709/204 |
| 2007/0015494 A1 | 1/2007 | Sinclair et al. | |
| 2007/0067196 A1 | 3/2007 | Usui | |
| 2007/0244690 A1 * | 10/2007 | Peters | 704/8 |
| 2007/0293212 A1 * | 12/2007 | Quon et al. | 455/420 |
| 2007/0294368 A1 * | 12/2007 | Bomgaars et al. | 709/217 |
| 2008/0081604 A1 * | 4/2008 | Sung et al. | 455/422.1 |
| 2008/0091829 A1 * | 4/2008 | Spataro et al. | 709/227 |
| 2008/0140790 A1 * | 6/2008 | Gusler et al. | 709/206 |
| 2008/0212499 A1 * | 9/2008 | Maes | 370/265 |
| 2008/0215996 A1 * | 9/2008 | Vega et al. | 715/760 |
| 2008/0225718 A1 | 9/2008 | Raja et al. | |
| 2008/0240150 A1 | 10/2008 | Dias et al. | |
| 2008/0243866 A1 | 10/2008 | Pandey et al. | |
| 2008/0250332 A1 * | 10/2008 | Farrell et al. | 715/753 |
| 2008/0253363 A1 * | 10/2008 | Altberg et al. | 370/352 |
| 2008/0255910 A1 | 10/2008 | Bagchi et al. | |
| 2008/0270295 A1 * | 10/2008 | Lent et al. | 705/38 |
| 2009/0019372 A1 * | 1/2009 | Chu et al. | 715/748 |
| 2009/0100431 A1 | 4/2009 | Doyle et al. | |
| 2009/0320101 A1 * | 12/2009 | Doyle et al. | 726/4 |
| 2010/0169444 A1 | 7/2010 | Lingafelt et al. | |

OTHER PUBLICATIONS

Final Office Action dated Aug. 31, 2011 for U.S. Appl. No. 12/602,936.

Notice of Allowance dated May 2, 2012 for U.S. Appl. No. 12/602,936.

* cited by examiner

METHOD, SYSTEM AND PROGRAM PRODUCT FOR ASSIGNING A RESPONDER TO A REQUESTER IN A COLLABORATIVE ENVIRONMENT

CROSS-REFERENCE TO RELATED APPLICATIONS

This application is a continuation of application Ser. No. 12/602,936, which is the National Stage filing of International Application No. PCT/EP2008/59035, filed Jul. 10, 2008. This application is also a continuation of application Ser. No. 11/775,961, filed Jul. 11, 2007.

FIELD OF THE INVENTION

The present invention relates to data processing systems. In particular, the present invention relates to a method, system and computer programs for assigning collaborative resources, such as, help desk personnel to customers.

BACKGROUND OF THE INVENTION

In today's business environment, customers are increasingly conducting online or electronic transactions with organizations and/or businesses, such as retailers, banking services, etc. Often, a customer needing assistance is directed to call a call centre or help desk, where the customer may have a considerable wait for assistance. As an alternative, many organizations and/or businesses provide real-time communication services to customers where a customer can use text based communication to communicate with a customer service representative over the Internet. As such, there is a need for a business and/or organization to provide cost-effective ways to strengthen their ability to provide customer service without burdening the customer with having to wait for assistance as well as without overloading the customer service representatives.

SUMMARY OF THE INVENTION

In a first aspect of the invention, there is provided a method of providing a collaborative resource service. The method comprises defining, using a collaboration tool, a threshold value for one or more collaborative attributes for one or more collaborative resources utilized to respond to one or more collaborative clients in a collaborative infrastructure and calculating on a periodic basis, using the collaboration tool, an updated value for the one or more collaborative attributes for each of the one or more collaborative resources; receiving in the collaborative infrastructure a request for collaboration from a collaborative client of one or more collaborative clients, comparing the updated value with the threshold value defined for the one or more collaborative attributes for a first collaborative resource of the one or more collaborative resources and, if the updated value is less than the threshold value for the one or more collaborative attributes for the first collaborative resource, connecting the collaborative client to the first collaborative resource for establishing a collaborative session in the collaborative infrastructure.

Preferably, the present invention provides a method further comprising comparing the updated value with the threshold value for the one or more collaborative attributes for another collaborative resource of the one or more collaborative resources, if the updated value is greater than the threshold value for the one or more collaborative attributes for the first collaborative resource and, if the updated value is less than the threshold value for the one or more collaborative attributes for the another collaborative resource, connecting the collaborative client to the another collaborative resource for establishing the collaborative session in the collaborative infrastructure.

Preferably, the present invention provides a method further comprising repeating the comparing step until a collaborative resource is found whose updated value is less than the threshold value for the one or more collaborative attributes and connecting the collaborative client to the collaborative resource for establishing the collaborative session in the collaborative infrastructure.

Preferably, the present invention provides a method wherein a collaborative infrastructure is an instant messaging collaboration infrastructure, the collaborative resource is an instant messaging responder and the collaborative client is an instant messaging client.

Preferably, the present invention provides a method wherein the one or more collaborative attributes comprising at least one of average number of words, number of simultaneous collaborative conversations and emotional capability value.

Preferably, the present invention provides a method wherein the defining step includes assigning in a table a numerical value for an avatar corresponding to an emotional symbol of one or more emotional symbols for defining the threshold value for the emotional capability value and for calculating the updated value for the emotional capability value and assigning in a table a numerical value for a text-phrase corresponding to an emotional communication of one or more emotional communications for defining the threshold value for the emotional capability value and for calculating the updated value for the emotional capability value. The method further comprises sending a notification to an administrator of the collaborative infrastructure and sending a notification to the collaborative client if none of the one or more collaborative resources has a respective updated value that is less than a respective threshold value.

In another aspect of the invention, the present invention provides a collaborative system for facilitating collaborative sessions between one or more collaborative requesters and a collaborative responder based on an intensity level of the collaborative responder. The system comprises a network communications channel, a collaboration server connected to the network communications channel and having deployed thereon a collaboration tool for establishing a collaboration session between one or more collaborative requesters and a collaborative responder of one or more collaborative responders, the collaboration tool being configured to receive a request from a respective collaborative requester via the network communications channel and configured to connect the respective collaborative requester to a respective collaborative responder for establishing a respective collaborative session. The collaboration tool further comprises a first module configured to predefine a threshold value for one or more collaborative attributes for the respective collaborative responder and configured to calculate on a preset periodic basis an updated value for the one or more collaborative attributes for the respective collaborative responder. Further, the collaboration tool further comprises a network interface configured to facilitate access by one or more administrative resources to the first module and comprises a second module configured to establish a connection between the respective collaborative responder and the respective collaborative requester when the updated value calculated for the respective collaborative responder is less than the threshold value predefined, such that, the respective collaborative responder is suited to receive the request from the respective collaborative requester.

Preferably, the present invention provides a system wherein the collaboration server further comprises a storage system configured to store the threshold value predefined for the one or more collaborative attributes for the one or more collaborative responders and configured to store the updated value calculated for the one or more collaborative attributes for the one or more collaborative responders.

Preferably, the present invention provides a system wherein the collaboration server is an instant message collaboration server and the collaborative responder is an instant message responder.

Preferably, the present invention provides a system wherein the collaborative requester is an instant message requester and the collaborative session is an instant message session. In an embodiment, the one or more collaborative attributes comprises at least one of average number of words, number of simultaneous collaborative sessions and emotional capability value.

Preferably, the present invention provides a system wherein the first module is further configured to assign in a table a numerical value for an avatar corresponding to an emotional symbol of one or more emotional symbols for predefining the threshold value for the emotional capability value and to calculate the updated value for the emotional capability value and the first module is further configured to assign in a table a numerical value for a text-phrase corresponding to an emotional communication of one or more emotional communications for predefining the threshold value for the emotional capability value and to calculate the updated value for the emotional capability value. Further, if a first collaborative responder of the one or more collaborative responders has a respective updated value that is greater than a respective threshold value predefined for the first collaborative responder, then the second module is further configured to compare a respective updated value calculated with a respective threshold value preset for another collaborative responder of the one or more collaborative responders and to connect the collaborative requester to the another collaborative responder if the respective updated value calculated is less than the respective threshold value predefined.

Preferably, the present invention provides a system wherein the second module is further configured to send a notification to an administrator of the collaborative system if none of the one or more collaborative responders has a respective updated value that is less than a respective threshold value predefined and is further configured to send a notification to the collaborative requester.

In yet another aspect of the present invention there is provided a computer program product for establishing a collaboration session between a collaborative responder and one or more collaborative clients based on an intensity level of the collaborative responder. The computer program product comprises a computer readable medium and first program instructions to define a threshold value for one or more collaborative attributes for a collaborative responder of one or more collaborative responders configured to respond to one or more collaborative clients in a collaborative infrastructure. Further, the computer program product comprises second program instructions to calculate on a periodic basis, an updated value for the one or more collaborative attributes for each of the one or more collaborative responders and third program instructions to compare the updated value calculated with the threshold value defined for the one or more collaborative attributes for a first collaborative responder of the one or more collaborative responders upon receiving a request from a collaborative client of the one or more collaborative clients in order to establish a collaboration session. Moreover, the computer program product comprises fourth program instructions to connect the collaborative client to the first collaborative responder for establishing the collaboration session for the request received in the collaborative infrastructure, if the updated value calculated is less than the threshold value defined for the one or more collaborative attributes for the first collaborative responder. In an embodiment, the collaborative infrastructure is an instant messaging collaboration infrastructure, the collaborative responder is an instant messaging responder and the collaborative client is an instant messaging client. In an embodiment, the one or more collaborative attributes comprises at least one of average number of words, number of simultaneous collaboration sessions and emotional capability value. In an embodiment, the first program instructions further include instructions to assign in a table a numerical value for an avatar corresponding to an emotional symbol of one or more emotional symbols for defining the threshold value for the emotional capability value and to calculate the updated value for the emotional capability value and to assign in a table a numerical value for a text-phrase corresponding to an emotional communication of one or more emotional communications for defining the threshold value for the emotional capability value and to calculate the updated value for the emotional capability value. In an embodiment, the third program instructions further comprises instructions to compare the updated value calculated with the threshold value defined for the one or more collaborative attributes for another collaborative responder of the one or more collaborative responders, if the updated value calculated is less than the threshold value defined for the one or more collaborative attributes for the another collaborative responder, to connect the collaborative client to the another collaborative responder for establishing the collaborative session in the collaborative infrastructure. In one embodiment, the third program instructions further comprises instructions to repeat comparison of the updated value calculated with the threshold value defined for the one or more collaborative attributes for a next collaborative responder of the one or more collaborative responders, if the updated value is greater than the threshold value for the one or more collaborative attributes for the another collaborative responder until a collaborative responder is found whose updated value calculated is less than the threshold value defined for the one or more collaborative attributes for establishing the collaborative session connecting the collaborative client to the collaborative responder in the collaborative infrastructure. In an embodiment, the third program instructions further comprises instructions to optionally notify an administrator of the collaborative infrastructure if none of the one or more collaborative responders has a respective updated value calculated that is less than a respective threshold value defined and to optionally notify the collaborative client. Preferably, each of the first, second, third and fourth program instructions are recorded on the computer readable medium, executable by a processor.

BRIEF DESCRIPTION OF THE DRAWINGS

Embodiments of the invention are described below in detail, by way of example only, with reference to the accompanying drawings in which.

DETAILED DESCRIPTION OF THE INVENTION

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like. Modules may also be implemented in software for execution by various types of processors. An identified module or component of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Further, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, over disparate memory devices, and may exist, at least partially, merely as electronic signals on a system or network. Furthermore, modules may also be implemented as a combination of software and one or more hardware devices. For instance, a module may be embodied in the combination of a software executable code stored on a memory device. In a further example, a module may be the combination of a processor that operates on a set of operational data. Still further, a module may be implemented in the combination of an electronic signal communicated via transmission circuitry.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Moreover, the described features, structures, or characteristics of the invention may be combined in any suitable manner in one or more embodiments. It will be apparent to those skilled in the art that various modifications and variations can be made to the present invention without departing from the scope of the invention. Thus, it is intended that the present invention cover the modifications and variations of this invention provided they come within the scope of the appended claims and their equivalents. Reference will now be made in detail to the preferred embodiments of the invention.

Figure 1A:
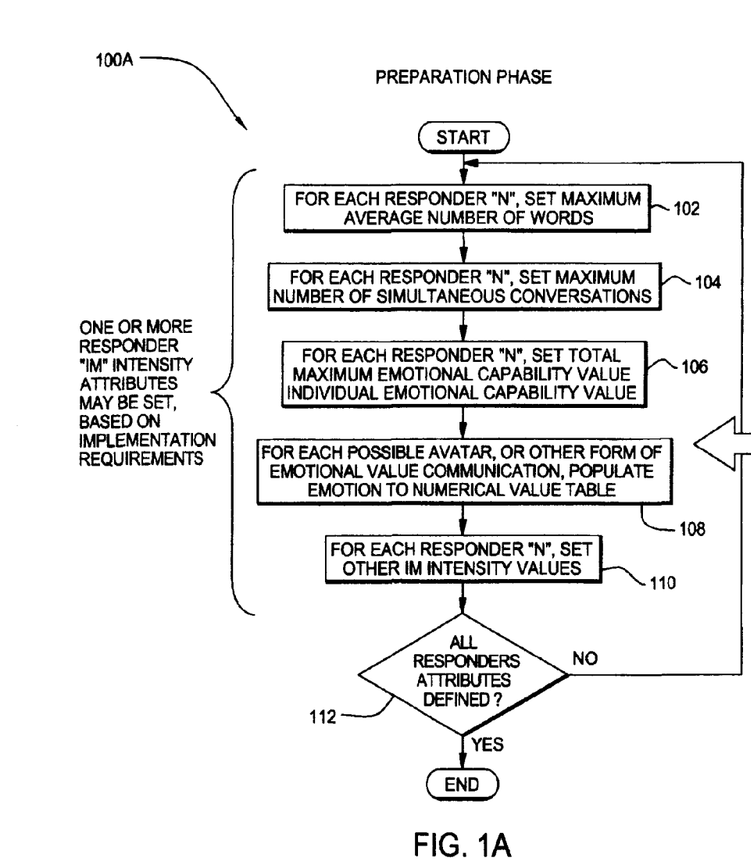
FIGS. 1A and 1B together depict a flowchart outlining the preparation steps for tracking an intensity level of one or more collaborative attributes pertaining to collaborative sessions managed by collaborative resources for assigning a collaborative resource to one or more collaborative clients, in accordance with a preferred embodiment of the present invention.
Figure 1B:
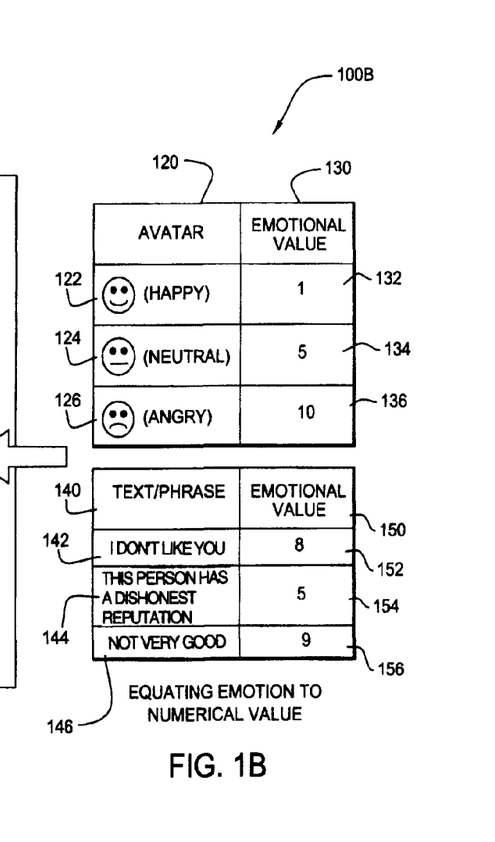

In one embodiment, the invention provides a method of providing a collaboration resource service of assigning a collaborative resource or responder to one or more collaborative clients or requesters based on an intensity level measured for collaborative sessions handled by the collaborative resource in a collaboration environment, such as, an instant message environment, as described herein below with respect to FIGS. 1A, 1B, 2 and 3. In particular, the invention provides a method of using collaboration environmental meta data, for instance, instant message environmental meta data to determine, from a pool of responders, a responder to respond to a collaboration request, such as, an instant message request. Although the invention is described using an instant message (IM) environment, the invention method can be used for any type of collaboration or collaborative environment. As used herein, the term "collaborative attribute(s)" or "instant message intensity attribute(s)" refers to attribute(s) or information pertaining to instant message conversations occurring within a collaboration or collaborative environment. Within an instant message environment, collaboration information or collaboration attributes pertaining to individual instant message conversations can be obtained for a given unit of time, for instance, the duration of a conversation or session, the number of simultaneous conversations or sessions, the average word size or number of words used within a conversation, the emotional intensity as evidenced by the instant message participants avatar (symbols and/or icons) and/or the number and type of emoticons (text and/or phrases describing an emotional state) used, as described further herein below with respect to FIG. 1B. In an embodiment, the collaborative attributes or information obtained is used to define the intensity level of one or more collaboration conversations(s) or session(s) being handled by a collaborative resource. It will be apparent to one skilled in the art that additional attributes or measures of conversation intensities may be used to measure the intensity of a conversation. Turning to FIG. 1A, reference numeral 100A describes the preparation steps for calculating or measuring an intensity level associated with one or more collaborative or collaboration sessions or conversation by tracking one or more collaborative attributes pertaining to the collaborative sessions in order to allocate or assign a collaborative resource or responder to one or more new collaborative clients or requesters or participants in a collaborative environment. In an embodiment, the process outlined in reference numeral 100A is carried out using a collaborative or collaboration tool or code that is configured to receive input or threshold values for one or more collaborative attributes that provide information regarding a collaborative conversation, for instance, an instant message (1M) session. The collaboration tool is further described herein below with respect to FIGS. 4 and 5. In particular, a user or administrator in a collaboration environment uses the collaboration tool to input or enter threshold values for one or more collaborative attributes or IM intensity attributes for each responder among a pool or set of responders, based on implementation requirements desired. The collaboration tool can be configured to receive input to alternative collaborative attributes that define intensity level corresponding to respective collaborative sessions being handled by a collaborative responder or respondent. As shown in FIG. 1A, the user or administrator enters or inputs or sets in step 102 a maximum or threshold average number of words for a collaborative session for each responder N. For example, the maximum or threshold value for the average number of words in an instant message (IM) conversation or in the aggregate of a plurality of IM conversations may be set to 50 words per unit time or per evaluation period. Further, in step 104, the user or administrator sets a maximum or threshold number of simultaneous conversations or sessions for each responder N in the pool of responders. For example, the threshold number of simultaneous conversations that can be assigned to an experienced responder may be set to 6, whereas, the threshold number of simultaneous conversations that can be assigned to a novice responder may be set to 3. Furthermore, the user or administrator sets in step 106 a total maximum emotional capability value (based on the preset number of simultaneous conversations) and an individual emotional capability value (based on perhaps the experience level of a responder N in the pool of responders. Moreover, as shown in 100B in FIG. 1B, a user or administrator equates an emotion in the form of a symbol and/or text and/or phrase with a numerical emotional value. In this embodiment, the larger the numerical value the more negative the implications to the IM conversation with scaling normalized with range from 1 to 10. Alternatively, a smaller numerical value may be associated with the more negative implication to the IM conversation with scaling normalized with range from 10 to 1. To those skilled in the art, it is understood that the normalized scale range may include different values. In particular, a possible avatar or symbol (column 120) is assigned an emotional value (column 130) and, further, a text or phrase (column 140) is assigned an emotional value (column 150) as well. In an embodiment, as shown in FIG. 1B, the equating of an emotion to a numerical value is achieved using an avatar table and a text/phrase table. For instance, an avatar for "Happy" (smiley face), reference numeral 122 is assigned or set an emotional value of 1 (reference numeral 132), whereas, an avatar for "Neutral (neutral face), reference numeral 124 is assigned an emotional value of 5, whereas, an avatar for "Angry" (frown face), reference numeral 126 is assigned an emotional value of 10 (reference numeral 136). In a similar fashion, a text/phrase (in column 140), such as "I don't like you" (reference numeral 142) may be assigned an emotional value of 8 (reference numeral 152), whereas, a text/phrase, such as "This person has a dishonest reputation" (reference numeral 144) may be assigned an emotional value of 5 (reference numeral 154), whereas, a text/phrase, such as "not very good" (reference numeral 146) may be assigned an emotional value of 9 (reference numeral 156). Accordingly, for each possible avatar or other forms of emotional value communication, such as, text or phrases, the collaboration tool populates in step 108 the emotion to numerical value table, as set forth in FIG. 1B. Furthermore, for each responder N, the user or administrator sets in step 110 other IM intensity values. It is understood by one skilled in the art that other avatars or other text or phrases describing different emotions may be used that have numerical values associated with them. In step 112, the collaboration tool determines whether or not the collaborative attributes have been defined for each responder based on the implementation requirements, as discussed herein above with respect to steps 102 through 108. If all the attributes have not been defined for each responder in step 112, the process starts with step 102 with the user or administrator setting or defining the values for the one or more collaborative attributes. If all the attributes have been defined in step 112, the process ends. The input for each collaborative attribute set forth in FIGS. 1A and 1B is used in FIG. 2 to obtain a responder's current intensity level or IM intensity, as described herein below.

Figure 2:
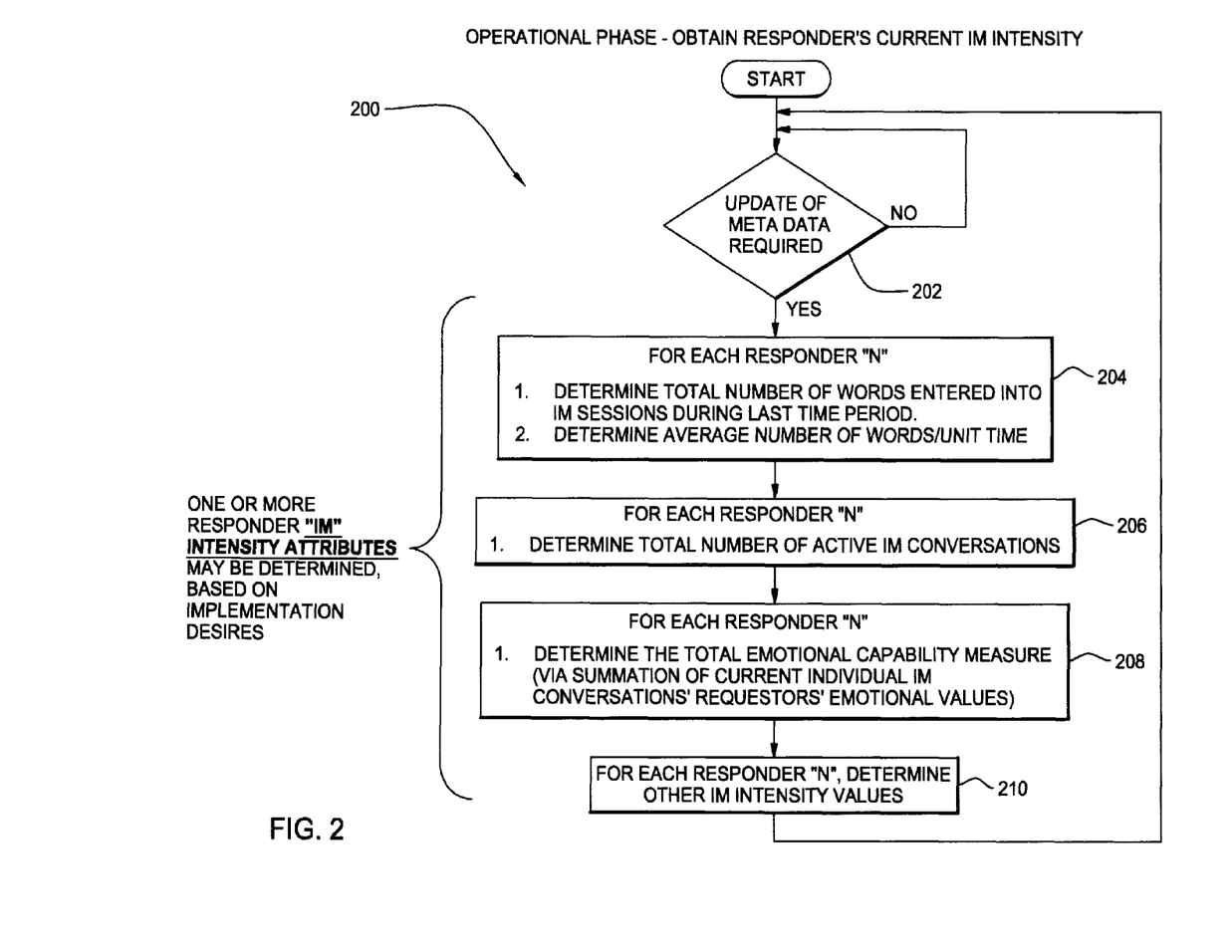
FIG. 2 depicts a flowchart outlining the operational steps for measuring a current intensity level of collaborative sessions handled by a collaborative resource among multiple collaborative resources for assigning the collaborative resource to one or more collaborative clients, in accordance with a preferred embodiment of the present invention.

Turning to FIG. 2, reference numeral 200 outlines the process of obtaining a responder's current or updated IM intensity level for the collaborative attributes corresponding to collaborative sessions handled by a collaborative resource in a given time period. In particular, the collaboration tool makes an inquiry in step 202 as to whether or not a user or administrator desires to update meta data (collaborative attributes) in order to obtain each responder's current IM intensity level, starting with a first responder or respondent, for instance, when a new requester or client requests connection to a requester or respondent. In an embodiment, the meta data or collaborative attributes can be updated by the collaboration tool on a periodic basis, such as, every half hour or every hour or every two hours or every three hours, based on implementation desires for a collaboration environment. If the user or administrator does not desire a current IM intensity level for each responder in the pool of responders in step 202, then the collaboration tool waits in step 200 until an update of each responder's current IM intensity level is desired by a user or administrator. If the user or administrator desires a current IM intensity level for each responder in the pool of responders in step 202, for instance, when a new client or requester needs to be connected to a responder, then for each responder N, the collaboration tool determines or calculates in step 204 the total number of words entered into an IM session during the last time period that is measured. For instance, if the collaboration tool is configured to update a responder's current IM intensity level every half hour, then the collaboration tool examines the information gathered for the last half hour. Accordingly, the collaboration tool determines or calculates in step 204 an average number of words entered into an IM session per unit time (namely, the last half hour) for each responder in the pool of responders. In addition, the collaboration tool determines or calculates in step 206 the total number of active IM conversations or sessions for each responder in the pool of responders for the last half hour. Furthermore, in step 208, the collaboration tool determines or calculates the total emotional capability measure for each responder N by summation of current individual IM conversations based on the emotional values measured for the one or more sessions handled by a given responder N in the last half hour. Additionally, in step 210, other IM intensity values are determined or calculated for each responder N for the last half hour. Accordingly, steps 204 through 210 are repeated each time meta data or collaborative attributes or IM intensity attributes are required to be updated, for instance, in order to assign a collaborative resource to a new client.

Figure 3:
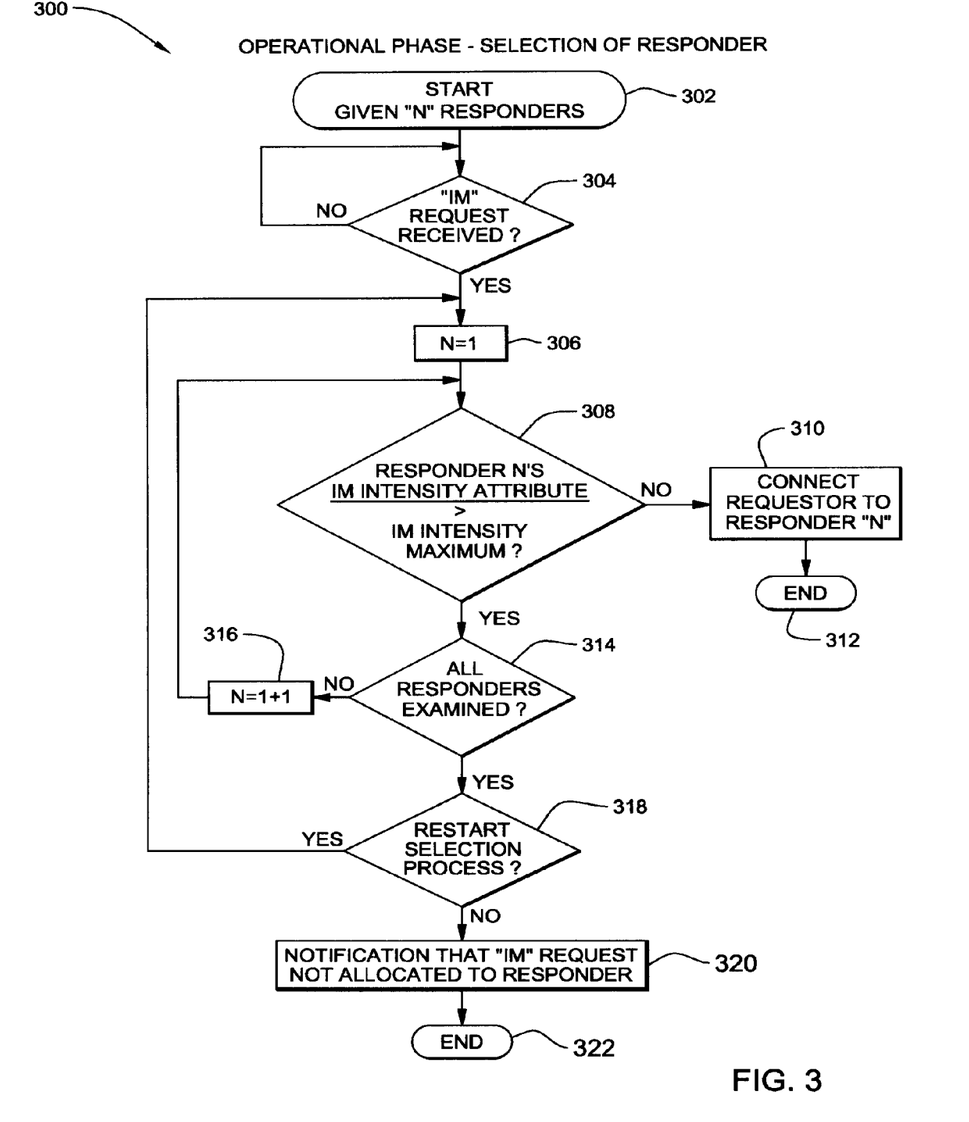
FIG. 3 depicts a flowchart outlining the operational steps for assigning a collaborative resource to one or more collaborative clients based on the current intensity level measured for the collaborative resource, in accordance with a preferred embodiment of the present invention.

Turning to FIG. 3, reference numeral 300 outlines the steps of selecting or assigning a collaborative resource or responder using the IM intensity level calculated for the last time period for each responder in the responder pool, as discussed herein above with respect to FIG. 2. Accordingly, given N responders in step 302, the collaboration tool determines in step 304 whether or not a collaborative request, such as an IM request is received from a collaborative requester or client. If no IM request is received in step 304, the collaboration tool waits until an IM request is received. On the other hand, if a collaborative request is received in step 304, the collaboration tool sets N=1 in step 306, corresponding to a first potentially available responder in the pool of responders available to handle the request. In step 308, the collaboration tool determines whether or not the first responder N's current IM intensity level calculated based on one or more collaborative attributes (as described herein above with respect to FIG. 2) is greater than the maximum IM intensity level set for the one or more collaborative attributes for the first responder, as described herein above with respect to FIGS. 1A and 1B. If the first responder N's current IM intensity level is not greater than the maximum IM intensity level set for the first responder, then the collaboration tool connects in step 310 the requester to the first responder, ending the selection process. However, if the first responder N's current IM intensity level is greater than the maximum IM intensity level set for the first responder, then the collaboration tool determines in step 314 whether or not the IM intensity levels of all responders have been examined. If the IM intensity levels of all responders have not been examined, the collaboration tool sets in step 316 N=1+1, corresponding to a second responder in the available set of responders and returns to step 308 to determine whether or not the second responder N's current IM intensity level calculated is greater than the maximum IM intensity level set for the second responder. The steps 308 through 316 are repeated until the current IM intensity levels of all responders has been examined. When the collaboration tool has determined in step 314 that it has examined the current IM intensity levels of all the responders, the collaboration tool makes an inquiry in step 318 whether or not to restart the responder selection or assignment process. If a user or administrator wishes to restart the responder selection process, the collaboration tool returns to step 306 and sets N=1 and repeats steps 308 through 316 until all responders have been examined. If a user or administrator does not wish to restart the responder selection process, the collaboration tool issues a notification in step 320 that an IM request has not been allocated to a responder, ending the process at step 322. In an embodiment, a service operator of the collaboration service is notified and/or the manager of the responders is notified and/or the requester is notified by being issued a message that "all responders are busy assisting other clients", etc. Alternatively, a back-up set of responders may be called into action. Accordingly, when a new request arrives from a requester, the method provides the information necessary to assign the request to a responder or resource that has not exceeded a threshold intensity level.

Figure 4:
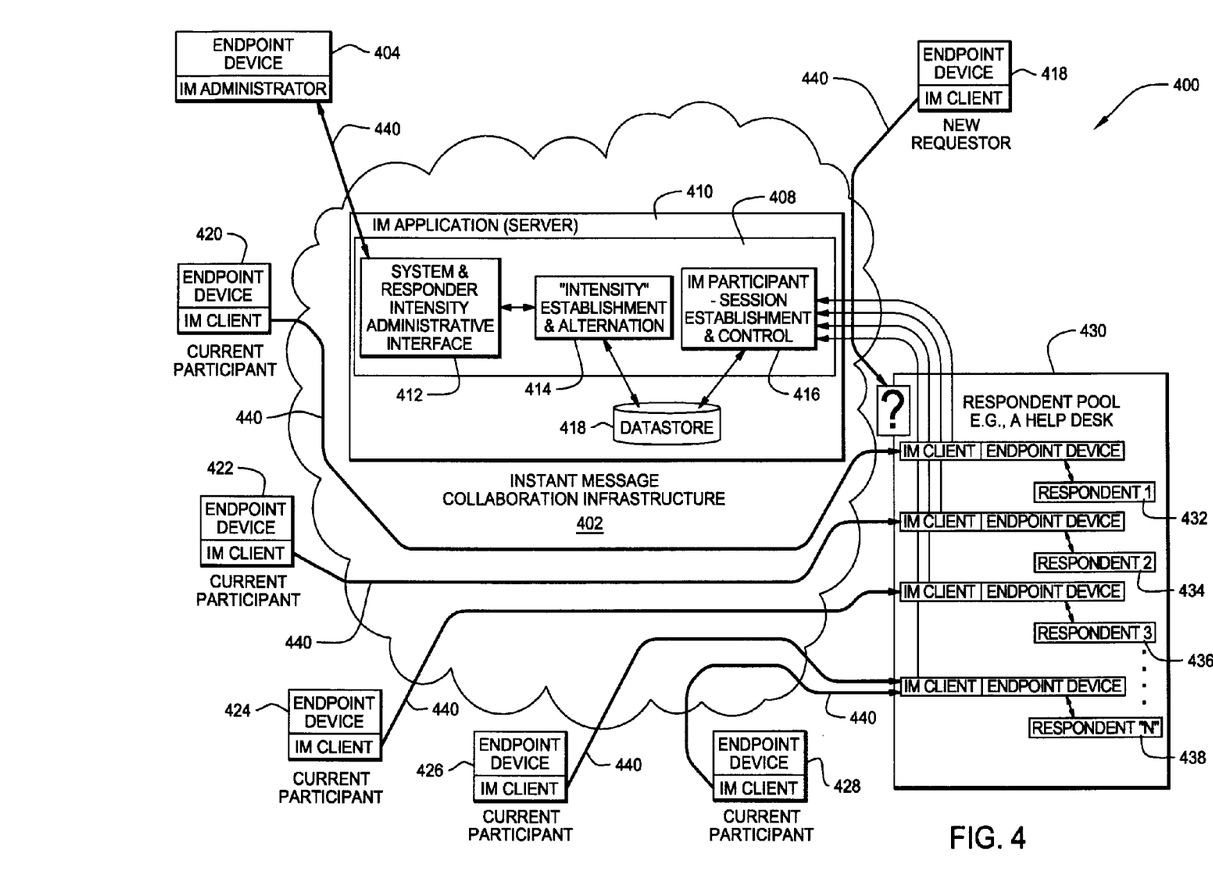
FIG. 4 is a schematic block system diagram illustrating an embodiment of a collaborative system for assigning a collaborative resource to one or more collaborative clients based on an intensity level measured for collaborative sessions handled by the collaborative resource, in accordance with a preferred embodiment of the present invention.

In another embodiment, the invention provides a collaborative system for facilitating collaborative sessions between a collaborative resource or responder or respondent and one or more collaborative clients or requesters, based on an intensity level measured for collaborative session(s) handled by a collaborative resource or responder. Reference is now made to FIG. 4, which illustrates an embodiment of a collaborative system for selecting or assigning a responder to one or more new requesters requesting collaboration, in accordance with an embodiment of the present invention. Turning to FIG. 4, FIG. 4 is a schematic block system diagram illustrating one embodiment of a collaborative system 400 comprising a collaboration infrastructure 402, namely, an instant message (IM) collaboration infrastructure 402, depicting one or more endpoint devices 404, 420, 422, 424, 426, 428 corresponding to collaborative clients currently connected to the collaboration infrastructure 402 via a network communications channel 440. In an embodiment, the IM collaboration infrastructure 402 comprises an application server, for instance, an IM application server 410 having deployed thereon an instant message (IM) application, where the IM application server 410 is shown connected to one or more endpoint devices via the network communications channel 440. In particular, the IM collaboration infrastructure 402 shows an IM administrator at an endpoint device 404 that can access and connect to the IM application server 410 within the IM collaboration infrastructure 402, for instance, for configuring the collaboration tool 408 deployed on the IM application server 410. Similarly, the IM collaboration infrastructure 402 shows a current participant or an IM client at each endpoint device 420, 422, 424, 426, 428, where each IM client is configured to access and connect to the IM collaboration infrastructure 402. In an embodiment, the IM collaboration infrastructure 402 includes an IM application server 410, which has deployed thereon a collaboration tool 408. In one embodiment, as shown in FIG. 4, the collaboration tool or code 408 which runs on the IM application server or system 410 comprises a logic unit that contains a plurality of modules configured to functionally execute the necessary steps of facilitating collaborative sessions between one or more collaborative requesters and a collaborative responder based on an intensity level calculated for the collaborative responder. In particular, the collaboration tool or code 408 includes a system and responder intensity administrative interface or network interface 412, an intensity establishment and alternation module 414 (also referred to herein as intensity level establishment and alternation module or simply as a first module) and an IM participant session establishment and control module 416 (also referred to herein as a collaborative session establishment and control module or simply as a second module). It is understood by one skilled in the art that the collaboration tool may include other modules, such as a communications module (not shown in FIG. 4) configured to permit communication between the various modules of the collaboration tool or code 408 and other various components within the IM collaboration infrastructure 402. In an embodiment, the system and responder intensity administrative interface or network interface 412 is configured to facilitate access by one or more IM administrative resources or administrators to the intensity establishment and alternation module 414. Accordingly, an IM administrator can input or predefine into the intensity establishment and alternation module 414, via the system and responder intensity administrative interface or network interface 412, the various threshold values for the one or more collaborative attributes pertaining to a collaborative session for each responder or respondent, as discussed with respect to FIGS. 1A and 1B. Further, in an embodiment, the intensity establishment and alternation module 414 is configured to calculate or measure on a preset periodic basis an updated value for the collaborative attributes for each of the collaborative resources or respondents. Additionally, the intensity establishment and alternation module 414 is configured to assign in a table a numerical value for an avatar corresponding to an emotional symbol of one or more emotional symbols for predefining the threshold value for the emotional capability value and to calculate the updated value for the emotional capability value and the intensity level establishment and alternation module or first module is further configured to assign in a table a numerical value for a text-phrase corresponding to an emotional communication of one or more emotional communications for predefining the threshold value for the emotional capability value and to calculate the updated value for the emotional capability value. Moreover, the IM participant session establishment and control module 416 is configured to establish a connection between a responder and a requester when the updated or calculated IM intensity value for the collaborative attributes measured pertaining to the collaborative session(s) (discussed with respect to FIG. 2) handled by a collaborative resource or respondent is less than the maximum or threshold value preset by the IM administrator, as outlined with respect to FIGS. 1A and 1B. Further, if a first collaborative responder of the one or more collaborative responders has a respective updated value that is greater than a respective threshold value predefined for the first collaborative responder, then the collaborative session establishment and control module or second module is further configured to compare a respective updated value calculated with a respective threshold value preset for another collaborative responder of the one or more collaborative responders and to connect the collaborative requester to the another collaborative responder if the respective updated value calculated is less than the respective threshold value predefined. In an embodiment, the collaborative session establishment and control module is further configured to send a notification to an administrator of the collaborative system if none of the one or more collaborative responders has a respective updated value that is less than a respective threshold value predefined and is further configured to send a notification to the collaborative requester. Furthermore, as shown in FIG. 4, the IM application server 410 includes a storage system or data store 418, which in an embodiment is configured to store the maximum or threshold values inputted by a user or administrator into the collaboration tool 408 (as per FIGS. 1A and 1B), as well as the updated current IM intensity values calculated by the collaboration tool (as per FIG. 2). As shown, in the IM collaboration infrastructure 402, the IM client at endpoint device 420 is connected to respondent 1, reference numeral 432, among the available respondents in respondent pool 430. Similarly, the IM client at endpoint device 422 is connected to respondent 2, reference numeral 434, whereas, the IM client at endpoint device 424 is connected to respondent 3, reference numeral 436. Moreover, the IM clients at respective endpoint devices 426 and 428 are both connected to respondent N, reference numeral 438. Furthermore, FIG. 4 shows that a new requester, namely, an IM client at endpoint device 418 has not been connected to a responder and is waiting to be connected to a responder among the respondent pool 430. As such, the collaboration tool carries out the steps outlined in FIG. 3 in order to select a responder from the respondent pool 430 based on a comparison of the responder's intensity level calculated using the process outlined in FIG. 2 with the preset or predefined threshold values established for the responder (outlined in FIGS. 1A and 1B) and will connect the new requester at endpoint device 418 to a responder from the respondent pool 430 whose intensity level is less than the preset maximum or threshold level set in FIGS. 1A and 1B, using the process outlined herein above in FIGS. 2 and 3.

Figure 5:
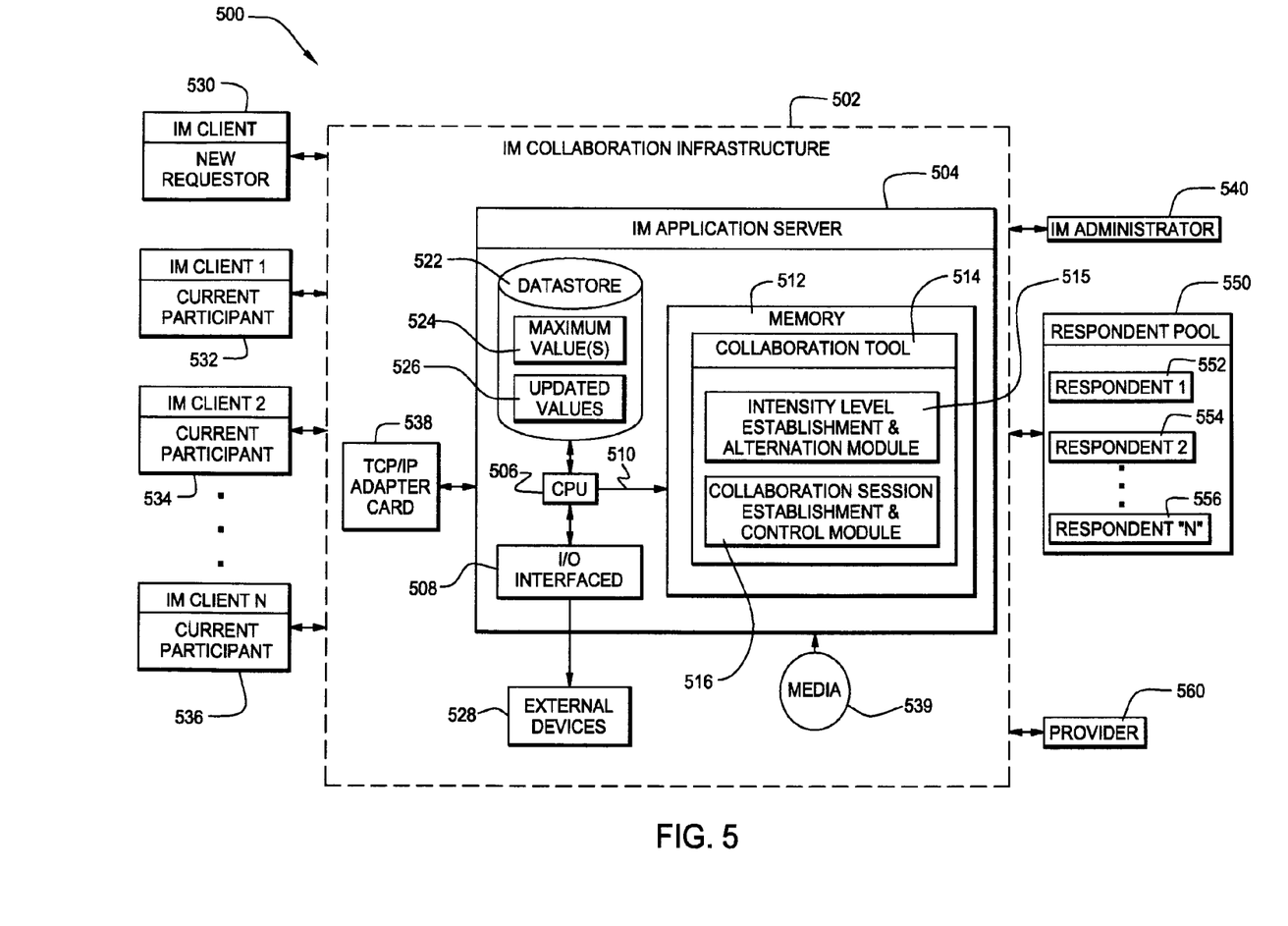
FIG. 5 is a schematic block system diagram illustrating an embodiment of an IM (instant message) collaboration infrastructure comprising a computer program product for assigning a collaborative resource to one or more collaborative clients based on an intensity level measured for collaborative sessions handled by the collaborative resource, in accordance with a preferred embodiment of the present invention.

Referring now to FIG. 5, there is illustrated a system 500 that provides a computer program product for establishing a collaboration session between a collaborative responder and one or more collaborative clients based on an intensity level measured for the collaborative responder, in accordance with an embodiment of the present invention. The computer program product comprises a computer readable or computer-usable medium, which provides program code, namely, the collaboration tool 514, for use by or in connection with a computer or any instruction execution system. The collaboration tool or program 514 can be loaded into computer system 504 from a computer readable media 539, such as, a magnetic tape or disk, optical media, DVD, memory stick, semiconductor memory, etc, or downloaded from the Internet via a TCP/IP adapter card 538. The term "computer readable storage device" does not encompass a propagation media. As depicted in FIG. 5, system 500 includes a computer infrastructure 502, namely, an IM (Instant Message) collaboration infrastructure 502, which is intended to represent any type of computer architecture that is maintained in a secure environment (i.e., for which access control is enforced). As shown, infrastructure 502 includes a computer system 504 that typically represents an application server or system 504, in particular, an IM application server or the like that includes an collaboration tool or program 514 configured to assign or select a responder for a requester based on an intensity level measured for the responder. It should be understood, however, that although not shown, other hardware and software components (e.g., additional computer systems, switches, routers, firewalls, etc.) could be included in infrastructure 502.

In general, one or more IM clients, for instance, IM client 1 (reference numeral 532), IM client 2 (reference numeral 534) through IM client N (reference numeral 536) access the IM application server or system 504, which has deployed thereon the collaboration tool 514, which implements the invention. The collaboration tool or program 514 is run on the application server 504 to select or assign a collaborative responder or respondent, for instance, any of the respondents 1, 2 through N (respective reference numerals 552, 554 through 556) available in the respondent pool 550 to a new collaborative client or requester, for instance, IM client (reference numeral 530) when a collaborative responder's measured intensity level is less than a threshold value set for the collaborative responder. As shown in FIG. 5, the IM application server or system 504 (which has implemented thereon the collaboration tool 514) is shown in communication with a general storage or file system or data store 522, which in an embodiment stores the maximum or threshold values 524 that have been preset or predefined for each of the responders in a respondent pool. Further, in an embodiment, the data store 522 stores the updated value calculated on a periodic basis, by the collaboration tool 514, for determining an intensity level of a responder in order to assign a client to the responder. In particular, current participants (IM client, reference numerals 532, through IM client N, reference numeral 536) access the IM application server or system 504 over a network via interfaces (e.g., web browsers) loaded on a client, for example, a personal computer, a laptop, a handheld device, etc. In the case of the latter, the network can be any type of network such as the Internet, a local area network (LAN), a wide area network (WAN), a virtual private network (VPN), etc. In any event, communication with infrastructure 502 could occur via a direct hardwired connection (e.g., serial port), or via an addressable connection that may utilize any combination of wireline and/or wireless transmission methods. Moreover, conventional network connectivity, such as Token Ring, Ethernet, WiFi or other conventional communications standards could be used. Still yet, connectivity could be provided by conventional TCP/IP sockets-based protocol. In this instance, the parties could utilize an Internet service provider to establish connectivity to infrastructure 502. It should be understood that under the present invention, infrastructure 502 could be owned and/or operated by a party such as provider 560, or by an independent entity that provides a collaboration resource service of assigning a collaborative resource based on an intensity level measured for the collaborative resource. Regardless, use of infrastructure 502 and the teachings described herein could be offered to the parties on a subscription or fee-basis. In either scenario, an administrator, in this case, an IM administrator 540 could support and configure infrastructure 502, for instance, upgrading the collaboration tool 514 in the IM application server or system 504 and/or updating the predefined threshold or maximum values entered into the collaboration tool 514 for each respondent in the respondent pool.

The collaboration server 504 is shown to include a CPU (hereinafter "processing unit 506"), a memory 512, a bus 510, and input/output (I/O) interfaces 508. Further, the server 504 is shown in communication with external I/O devices/resources 528 and storage system (data store) 522. In general, processing unit 506 executes computer program code, such as the collaboration tool 514, including the intensity level establishment and alternation module (first module) 515 and/or the collaboration session establishment and control module (second module) 516, as described herein above with respect to FIG. 4. While executing computer program code, the processing unit 506 can read and/or write data to/from memory 512, storage system 522, and/or I/O interfaces 508. For instance, in one embodiment, the collaboration tool 514 stores a copy of the threshold or maximum value(s) 524 set for the collaborative attributes for each responder in a working directory in storage 522. Similarly, the collaboration tool 514 stores a copy of the updated value(s) 526 for the collaborative attributes calculated for each responder periodically in a working directory in storage 522. Alternatively, the threshold or maximum value(s) 524 and/or updated value(s) 526 may be stored in a separate storage within the collaboration infrastructure 502. Bus 510 provides a communication link between each of the components in computer system 500, such that information can be communicated within the infrastructure 502. External devices 524 can comprise any devices (e.g., keyboard, pointing device, display, etc.) that enable a user and/or administrator to interact with computer system 500 and/or any devices (e.g., network card, modem, etc.) that enable server 504 to communicate with one or more other computing devices.

Computer infrastructure 502 is only illustrative of various types of computer infrastructures for implementing the invention. For example, in an embodiment shown, computer infrastructure 502 comprises two or more computing devices (e.g., a server cluster) that communicate over a network to perform the various process steps of the invention. Moreover, computer system 500 is only representative of various possible computer systems that can include numerous combinations of hardware. To this extent, in other embodiments, computer system 500 can comprise any specific purpose computing article of manufacture comprising hardware and/or computer program code for performing specific functions, any computing article of manufacture that comprises a combination of specific purpose and general purpose hardware/software, or the like. In each case, the program code and hardware can be created using standard programming and engineering techniques, respectively. Moreover, processing unit 506 may comprise a single processing unit, or be distributed across one or more processing units in one or more locations, e.g., on a client and server. Similarly, memory 512 and/or storage system 522 can comprise any combination of various types of data storage that reside at one or more physical locations, but the terms "memory" and "storage system" do not encompass a propagation media. Further, I/O interfaces 508 can comprise any system for exchanging information with one or more external devices 524. Still further, it is understood that one or more additional components (e.g., system software, math co-processing unit, etc.) not shown in FIG. 5 can be included in computer system 500. However, if computer system 500 comprises a handheld device or the like, it is understood that one or more external devices 524 (e.g., a display) and/or storage system(s) 522 could be contained within computer system 504, and not externally as shown. Storage system 522 can be any type of system (e.g., a database) capable of providing storage for information under the present invention, such as, the threshold values and updated values stored by the collaboration tool 514. To this extent, storage system 522 could include one or more storage devices, such as a magnetic disk drive or an optical disk drive, but does not include a propagation media. In another embodiment, storage system 522 includes data distributed across, for example, a local area network (LAN), wide area network (WAN) or a storage area network (SAN) (not shown). Although not shown, additional components, such as cache memory, communication systems, system software, etc., may be incorporated into computer system 500.

The foregoing descriptions of specific embodiments of the present invention have been presented for the purpose of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

The invention claimed is:

1. A method of managing access to first and second support persons, the first support person currently engaged in one or more chat sessions with one or more first customers respectively, the second support person currently engaged in one or more chat sessions with one or more second customers respectively, the method comprising the steps of:

a computer determining a first workload of the first support person based in part on an amount of text entered by the one or more first customers into the one or more respective chat sessions with the first support person and determining a second workload of the second support person based in part on an amount of text entered by the one or more second customers into the one or more respective chat sessions with the second support person; and the computer receiving a request to initiate another chat session between a support person and a third customer, and in response, the computer determining which of the first and second support persons has a lesser amount of workload based in part on which of the first and second support persons has a lesser amount of combined text in their respective one or more chat sessions, and based in part on the determination of which of the first and second support persons has a lesser amount of workload, the computer initiating a chat session between the third customer and the first or second support person which has the lesser amount of workload.

2. A computer program product for managing access to first and second support persons, the first support person currently engaged in one or more chat sessions with one or more first customers respectively, the second support person currently engaged in one or more chat sessions with one or more second customers respectively, the computer program product comprising:

one or more computer-readable tangible storage devices and program instructions stored on at least one of the one or more storage devices, the program instructions comprising:

program instructions to determine a first workload of the first support person based in part on an amount of text entered by the one or more first customers into the one or more respective chat sessions with the first support person and determine a second workload of the second support person based in part on an amount of text entered by the one or more second customers into the one or more respective chat sessions with the second support person; and program instructions to receive a request to initiate another chat session between a support person and a third customer, and in response, determine which of the first and second support persons has a lesser amount of workload based in part on which of the first and second support persons has a lesser amount of combined text in their respective one or more chat sessions, and based in part on the determination of which of the first and second support persons has a lesser amount of workload, initiate a chat session between the third customer and the first or second support person which has the lesser amount of workload.

3. A computer system for managing access to first and second support persons, the first support person currently engaged in one or more chat sessions with one or more first customers respectively, the second support person currently engaged in one or more chat sessions with one or more second customers respectively, the computer system comprising: one or more processors, one or more computer-readable memories, one or more computer-readable tangible storage devices, and program instructions stored on at least one of the one or more storage devices for execution by at least one of the one or more processors via at least one of the one or more memories, the program instructions comprising:

program instructions to determine a first workload of the first support person based in part on an amount of text entered by the one or more first customers into the one or more respective chat sessions with the first support person and determine a second workload of the second support person based in part on an amount of text entered by the one or more second customers into the one or more respective chat sessions with the second support person; and program instructions to receive a request to initiate another chat session between a support person and a third customer, and in response, determine which of the first and second support persons has a lesser amount of workload based in part on which of the first and second support persons has a lesser amount of combined text in their respective one or more chat sessions, and based in part on the determination of which of the first and second support persons has a lesser amount of workload, initiate a chat session between the third customer and the first or second support person which has the lesser amount of workload.

* * * * *